(12) United States Patent
Singhal et al.

(10) Patent No.: US 7,289,936 B2
(45) Date of Patent: Oct. 30, 2007

(54) STATE-BASED METHOD AND APPARATUS FOR EVALUATING THE PERFORMANCE OF A CONTROL SYSTEM

(75) Inventors: Ashish Singhal, Thiensville, WI (US); Timothy I. Salsbury, Whitefish Bay, WI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 11/348,522

(22) Filed: Feb. 6, 2006

(65) Prior Publication Data

US 2007/0185686 A1 Aug. 9, 2007

(51) Int. Cl.
*G05B 11/01* (2006.01)
(52) U.S. Cl. .................. 702/182; 702/183; 702/108; 700/26
(58) Field of Classification Search .............. 702/182
See application file for complete search history.

(56) References Cited

U.S. PATENT DOCUMENTS

| | | | |
|---|---|---|---|
| 6,298,454 B1 * | 10/2001 | Schleiss et al. | 714/37 |
| 6,615,090 B1 * | 9/2003 | Blevins et al. | 700/26 |
| 7,024,336 B2 | 4/2006 | Salsbury et al. | |
| 7,124,637 B2 | 10/2006 | Singhal et al. | |
| 2002/0116075 A1 * | 8/2002 | Salsbury | 700/1 |
| 2003/0153986 A1 * | 8/2003 | Salsbury et al. | 700/11 |
| 2003/0171901 A1 * | 9/2003 | Salsbury | 703/2 |
| 2004/0215356 A1 * | 10/2004 | Salsbury et al. | 700/44 |
| 2005/0204818 A1 | 9/2005 | Singhal et al. | |
| 2005/0256661 A1 | 11/2005 | Salsbury et al. | |
| 2005/0284160 A1 | 12/2005 | Singhal et al. | |

OTHER PUBLICATIONS

Chen et al., "Modeling of Discrete Event Systems Using Finite State Machines with Parameters," *Proceedings of the 2000 IEEE International Conference on Control Applications*, Anchorage, Alaska, USA, Sep. 25-27, 2000 (pp. 941-946).

Desborough, Lane et al., "Performance Assessment Measures for Univariate Feedback Control," *The Canadian Journal of Chemical Engineering*, Dec. 1992 (pp. 1186-1197), vol. 70.

Ghedamsi et al., "Multiple Fault Diagnostics for Finite State Machines," *Proceedings of the Twelfth Annual Joint Conference of the IEEE Computer and Communications Societies—IEEE INFOCOM '93*, SanFrancisco, CA, 1993 (pp. 782-791), no month.

(Continued)

*Primary Examiner*—Hal Wachsman
(74) *Attorney, Agent, or Firm*—Foley & Lardner LLP

(57) ABSTRACT

A method of evaluating the performance of a control system using an electronic device having state machine logic. The state machine logic includes determining a first logic state representative of a first condition of the control system based on data received from the control system. The state machine logic also includes executing a first testing function and transitioning to a second logic state representative of a second condition of the control system based on at least one of the received data and output from the first testing function. The state machine logic further includes executing a second testing function and providing a diagnosis of the performance of the control system based on the output of at least one of the first testing function and the second testing function.

35 Claims, 4 Drawing Sheets

OTHER PUBLICATIONS

Hadjicostis, "Probabilistic Fault Detection in Finite-State Machines Based on State Occupancy Measurements," *Proceedings of the 41st IEEE Conference on Decision and Control*, Las Vegas, Nevada USA, Dec. 2002 (pp. 3994-3999).

Hägglund, T., "A Control-Loop Performance Monitor," *Control Engineering Practice*, 1995 (pp. 1543-1547, 1549-1551), vol. 3, No. 11, Elsevier Science Ltd., no month.

Horch, Alexander, "A simple method for detection of stiction in control valves," *Control Engineering Practice*, 1999 (pp. 1221-1231), vol. 7, Elsevier Science Ltd., no month.

Magni et al., "A Fault Detection and Isolation Method for Complex Industrial Systems," *IEEE Transactions on Systems, Man, and Cybernetics-Part A:Systems and Humans*, vol. 30, No. 6, Nov. 2000 (pp. 860-865).

Miao, Tina et al., "Automatic Detection of Excessively Oscillatory Feedback Control Loops," *Proceedings of the 1999 IEEE International Conference on Control Applications*, Kohala Coast-Island of Hawaii, Aug. 22-27, 1999 (pp. 359-364).

Salsbury, "A practical method for assessing the performance of control loops subject to random load changes," *Journal of Process Control*, vol. 15, 2005 (pp. 393-405), no month.

Salsbury et al., "A New Approach for ARMA Pole Estimation Using Higher-Order Crossings," Proceedings of the 2005 American Control Conference, Portland, OR, 2005 (pp. 4458-4463), no month.

Seem, John E. et al., "A New Sequencing Control Strategy for Air-Handling Units," *HVAC&R Research, International Journal of Heating, Ventilating, Air-Conditioning and Refrigerating Research*, Jan. 1999 (pp. 35-58 with 2 cover pages), vol. 5, No. 1, American Society of Heating, Refrigerating and Air-Conditioning Engineers, Inc.

Singhal, "A Finite State Machine Framework for Control Loop Performance Monitoring," *JCI Technical Report*, Dec. 7, 2005 (pp. 1-18).

Singhal et al., "A simple method for detecting valve stiction in oscillating control loops," *Journal of Process Control*, vol. 15, 2005 (pp. 371-382), no month.

Sinnamohideen, Kasim, "Discrete-Event Diagnostics of Heating, Ventilation, and Air-Conditioning Systems," *Proceedings of the American Control Conference*, Arlington, VA, Jun. 25-27, 2001 (pp. 2072-2076).

Sklyarov, "Hierarchical Finite-State Machines and Their Use for Digital Control," *IEEE Transactions on Very Large Scale Integration (VLSI) Systems*, vol. 7, No. 2, Jun. 1999 (pp. 222-228).

Wang et al., "Fault Detection with Multiple Observers," *IEEE/ACM Transactions on Networking*, vol. 1, No. 1, Feb. 1993 (pp. 48-55).

Åström et al., "Revisiting the Ziegler-Nichols step response method for PID control," *Journal of Process Control*, vol. 14, 2004 (pp. 635-650).

Aström et al., "PID Controllers; Theory, Design, and Tuning," *Instrument Society of America*, 2nd ed, Research Triangle Park, NC, 1995 (pp. 130-131).

Chandra et al., "Automated Control Synthesis for an Assembly Line Using Discrete Event System Control Theory," *IEEE Transactions on Systems, Man, and Cybernetics-Part C: Applications and Reviews*, vol. 33, No. 2, May 2003 (pp. 284-289).

* cited by examiner

STATE-BASED METHOD AND APPARATUS FOR EVALUATING THE PERFORMANCE OF A CONTROL SYSTEM

FIELD

The present description relates generally to methods of and apparatuses for evaluating the performance of a control system. More specifically, the present description relates to automated methods of and apparatuses for providing a unified framework for executing testing functions based on the condition of the control system.

BACKGROUND

Control loops undergo a variety of conditions during their routine operation. For example, control loops in heating, ventilating, and air-conditioning (HVAC) systems for buildings may undergo setpoint changes, disturbances, slow drifts, etc. Characterizing the performance of control loops may ensure satisfactory operation of the control system, reduce variability and equipment wear, and detect problems such as oscillating behavior, sluggishness, and out-of-control situations.

Individual diagnostic testing functions exist for evaluating the performance of a control loop under particular operating conditions. For example, U.S. patent application Ser. No. 10/844,663 entitled "Method and Apparatus for Evaluating the Performance of a Control System," filed May 13, 2004, which issued as U.S. Pat. No. 7,024,336 on Apr. 4, 2006; U.S. patent application Ser. No. 10/876,854 entitled "Method and Apparatus for Evaluating the Performance of a Control System," filed Jun. 25, 2004; and PCT Application No. PCT/US2005/022127 entitled "Method and Apparatus for Evaluating the Performance of a Control System," filed Jun. 22, 2005, published as WO 2006/012158 on Feb. 2, 2006 provide examples of individual diagnostic testing functions for evaluating the performance of a control loop. Each of these diagnostic testing functions may typically provide a diagnosis for a particular control loop condition (e.g., oscillating behavior, sluggishness, etc.) while ignoring situations for which it was not designed.

There is need for a state-based method and apparatus for evaluating the performance of a control system that combines diagnostic testing functions into a unified framework for evaluating control loop performance under different loop conditions, such as setpoint changes, disturbances, oscillations, normal operating conditions, etc.

SUMMARY

According to an exemplary embodiment, a method of evaluating the performance of a control system using an electronic device having state machine logic includes determining a first logic state representative of a first state of the control system based on data received from the control system, executing a first testing function included in the electronic device and associated with the first logic state, transitioning to a second logic state representative of a second state of the control system based on at least one of the received data and output from the first testing function, executing a second testing function included in the electronic device and associated with the second logic state, and providing a diagnosis of the performance of the control system based on the output of at least one of the first testing function and the second testing function.

According to another exemplary embodiment, an apparatus for evaluating the performance of a control system includes memory including a plurality of testing functions. The apparatus also includes state machine logic including a plurality of logic states and configured to perform the steps of determining a first logic state representative of a first state of the control system based on data received from the control system, executing a first testing function associated with the first logic state, transitioning to a second logic state representative of a second state of the control system based on at least one of the received data and output from the first testing function, executing a second testing function included in the electronic device and associated with the second logic state, and providing a diagnosis of the performance of the control system based on the output of at least one of the first testing function and the second testing function.

According to another exemplary embodiment, an apparatus for evaluating the performance of a control system includes memory including a plurality of testing functions and means for detecting a plurality of transition events respectively associated with a plurality of logic states respectively representative of a plurality of conditions of the control system based on data received from the control system. The apparatus also includes means for executing at least a first one of the testing functions associated with a first one of the logic states when a first one of the conditions exists, and for executing at least a second one of the testing functions associated with a second one of the logic states when a second one of the conditions exists. The apparatus also includes means for providing a diagnosis of the performance of the control system based on output of at least one of the first testing function and the second testing function.

Other features and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and.

DETAILED DESCRIPTION

In the following description, for the purposes of explanation, numerous details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments. Furthermore, while the exemplary embodiments are often described in the context of an HVAC control system utilizing proportional plus integral (PI) action controllers, it should be understood that the disclosed method of and apparatus for evaluating the performance of a control system may be used in any of a variety of control systems and control methodologies.

Figure 1:
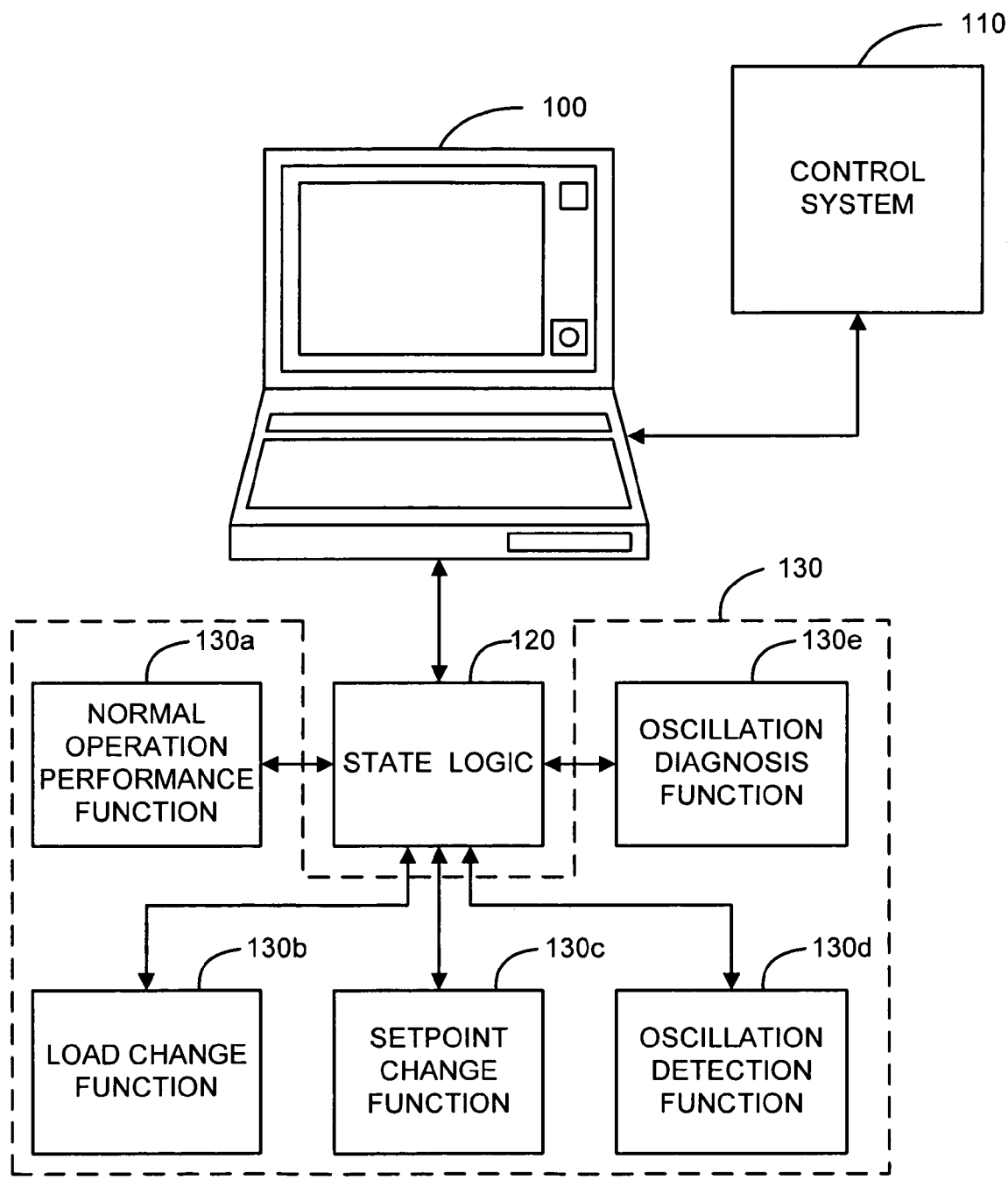
FIG. 1 is a diagram which illustrates an apparatus for evaluating the performance of a control system according to an exemplary embodiment.

FIG. 1 illustrates a testing tool 100 for evaluating the performance of a control system 110 according to an exemplary embodiment. Testing tool 100 includes state logic 120 and testing functions 130. In the illustrated embodiment, testing functions 130 include a normal operation performance function 130a, a load change function 130b, a setpoint change function 130c, an oscillation detection function 130d, and an oscillation diagnosis function 130e. Testing tool 100 may include additional, fewer, or differing testing functions 130 according to various other exemplary embodiments. Testing tool 100 may generally be used to evaluate the performance of control system 110. More specifically, testing tool 100 may combine one or more diagnostic testing functions 130 into a state-based framework for evaluating control loop performance (such as a control loop in an HVAC system) under different loop conditions, such as setpoint changes, disturbances, oscillations, normal operating conditions, etc.

Testing tool 100 may be implemented as any general purpose computing device, such as a microprocessor device with sufficient memory and processing capability. An exemplary device may include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer. Testing tool 100 may be implemented on, for example, a desktop or other computer (e.g., a stand-alone system or a networked system of computers), or on a portable device (e.g., laptop computer, personal digital assistant (PDA), etc.). For example, in the illustrated embodiment, testing tool 100 is implemented on a laptop computer which may be made available to field service personnel. According to another exemplary embodiment, testing tool 100 is integrated into a device, such as a field or supervisory controller, within control system 110.

Testing tool 100 in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including operator workstations, personal computers, hand-held devices, multi-processor systems, microprocessor-based or programmable consumer electronics, network PCs, minicomputers, mainframe computers, and the like. Testing tool 100 may also be implemented in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Testing tool 100, in other embodiments, may be implemented as software or a web application. Software and web implementations may be accomplished with standard programming techniques with rule based logic and other logic to accomplish the various testing and state logic functions. It should also be noted that software and web implementations may include implementations using one or more lines of software code, and/or hardware implementations, and/or equipment for receiving manual inputs.

Testing tool 100 is configured to be coupled (e.g., communicatively coupled) to control system 110 such that data may be exchanged (e.g., control signal data, etc.) between testing tool 100 and control system 110. Such coupling may be direct or remote. For example, according to an exemplary embodiment, testing tool 100 is remotely coupled to control system 110 via an external network connection (e.g., internet, intranet, Ethernet, etc.) or the like. According to another embodiment, testing tool 100 is directly coupled to control system 110 via a suitable connection port or terminal on a controller or device within control system 110. Testing tool 100 may be coupled to control system 110 using any suitable connection type or method, such as a wireless connection, a detachable communication cable, a "hard-wired" or other electrical or electronic connection, and the like. Testing tool 100 may be configured to work with discrete data samples from control system 110, and may be used on a batch of previously trended data, or online in a recursive fashion.

Control system 110 may be a system, such as an HVAC system, that may include one or more industrial controllers utilizing any of a variety of control methodologies. For example, in one embodiment the control methodology may be a proportional plus integral (PI) methodology, and control system 110 may include one or more digital PI controllers operating in discrete time which implement one or more feedback control loops. In other embodiments, control system 110 may include other types of control systems, methodologies, and control algorithms.

Figure 2:
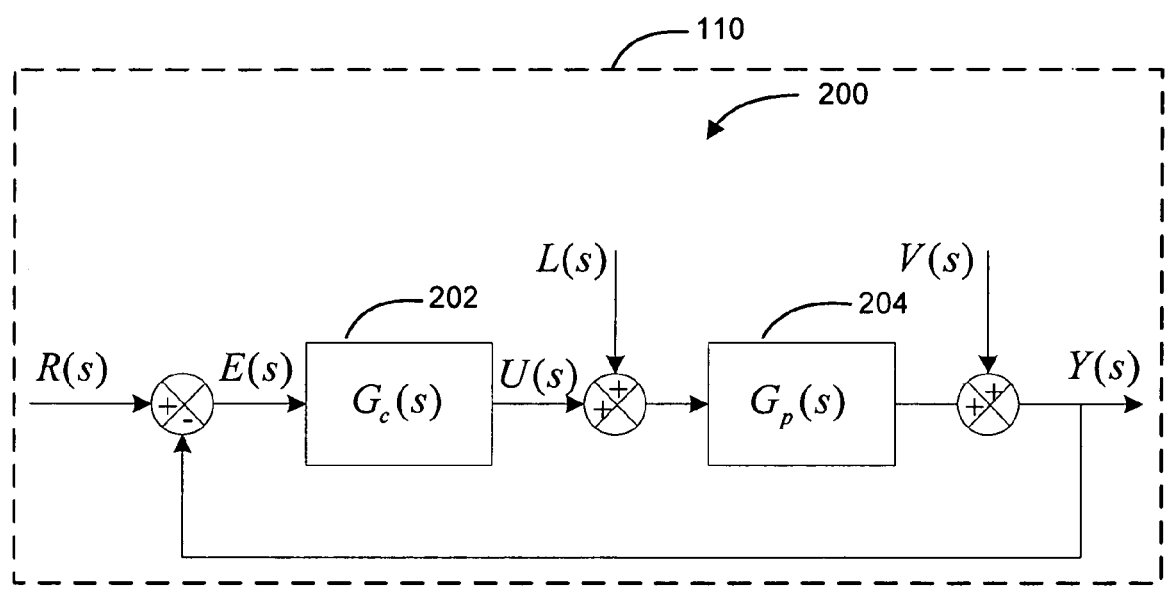
FIG. 2 is a diagram which illustrates an exemplary feedback control loop which may be tested using the apparatus of FIG. 1 according to an exemplary embodiment.

FIG. 2 illustrates an exemplary feedback control loop 200 in control system 110 (shown for reference) which may be tested using testing tool 100. Feedback control loop 200 includes a controller 202 and a plant 204, wherein plant 204 represents a device or system to be controlled by feedback control loop 200. In FIG. 2, s denotes the Laplace operator, $G_c(s)$ is the transfer function for the controller and $G_p(s)$ is the plant transfer function. R(s) is the input command or setpoint signal, Y(s) is the feedback signal which represents the variable being controlled, and E(s) is the error signal, which represents the difference between input command or setpoint signal R(s) and feedback signal Y(s). U(s) is the controller output, L(s) is a disturbance signal acting at the plant input, and V(s) is a disturbance signal acting on plant output. Preferably, feedback control loop 200 is designed so that error signal E(s) reaches zero at steady state. According to an exemplary embodiment, feedback control loop 200 is a PI feedback control loop and the controller transfer function is given by:

$$G_c(s) = \frac{U(s)}{E(s)} = K_c\left(1 + \frac{1}{T_i s}\right) \quad (1)$$

where $K_c$ is the controller gain and $T_i$ is the integral time.

Referring again to FIG. 1, state logic 120 may be a finite state machine (FSM) or finite automaton state-based framework configured to perform sequential logic and event triggered functions. Execution and interconnection of different testing functions 130 may be performed using, for example, event-triggered logic encapsulated in state logic 120.

The state-based framework of state logic 120 may include one or more states, transitions, and actions. A state may store information about current and past conditions of feedback control loop 200. A state may also reflect input changes from start to the present moment. Each state may have one or more of testing functions 130 associated therewith for evaluating and reporting the performance of control loop 200 when control loop 200 is in a condition corresponding to that particular state. A transition may be a state change internal to state logic 120 that is representative of a change in conditions in feedback control loop 200. A transition may be described by a condition to be met in feedback control loop 200 to enable the transition. Each state may also have one or more of testing functions 130 associated therewith for detecting a particular change in conditions in feedback control loop 200 to initiate a state transition. An action may be an activity, such as a testing function 130, to be performed at a given moment.

State logic 120 may be configured to evaluate control performance or execute a state transition based on information acquired from control system 110 regarding feedback control loop 200, as well as outputs from one or more testing functions 130. According to an exemplary embodiment, state logic 120 may acquire information including a controller output signal u(t), a setpoint signal r(t), and a plant output signal y(t) for feedback control loop 200 from control system 110, as well as a time stamp for this information or information regarding saturation of controller 202. State logic 120 may be configured to perform control performance evaluation based on this information, and to execute state transitions based on this information and outputs from one or more testing functions 130.

Figure 3:
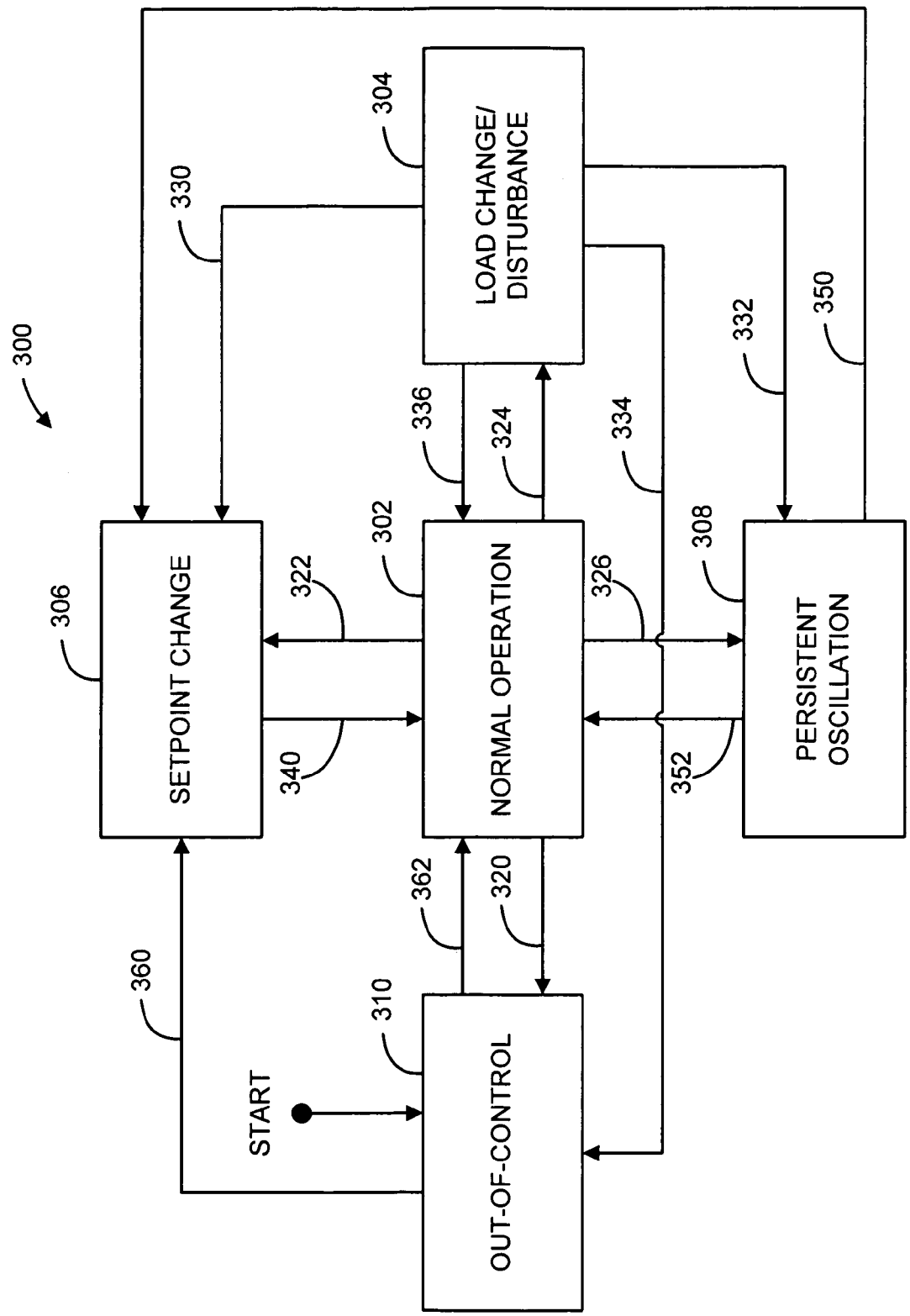
FIG. 3 is a data flow diagram of a state-based framework for the state logic shown in the apparatus of FIG. 1 according to an exemplary embodiment.

FIG. 3 is a data flow diagram of a state-based framework 300 for state logic 120 according to an exemplary embodiment. In the illustrated embodiment, the state-based framework 300 of state logic 120 includes five states, each representing a specific condition of control loop 200. The five states include a normal operation state 302, a load change/disturbance state 304, a setpoint change state 306, a persistent oscillation state 308, and an out-of-control state 310. Each of states 302, 304, 306, 308, and 310 may have one or more of testing functions 130 associated therewith for evaluating and reporting the performance of control loop 200 when control loop 200 is in a condition corresponding to that particular state. State logic 120 transitions from one of these states to another based on specific events occurring in control loop as indicated by information from control system 110 and outputs from one or more testing functions 130.

Normal operation state 302 represents a condition of control loop 200 wherein there are no setpoint changes occurring in setpoint signal R(s), and no load disturbances or oscillations occurring in control loop 200. In normal operation state 302, random stochastic disturbances are the only source of excitation. In normal operation state 302, state logic 120 may be configured to use information from control system 110, such as information regarding a setpoint change in setpoint signal r(t), saturation of controller 202, and/or timing of zero-crossings, peaks, and areas associated with error signal e(t). Error signal e(t) may be acquired from feedback control loop 200 by, for example, determining the difference between setpoint signal r(t) and plant output signal y(t). In normal operation state 302, state logic 120 may also be configured to use output from normal operation performance function 130a to evaluate the control performance of control loop 100, such as aggressiveness or sluggishness of controller 202. State logic 120 may also be configured to use output from load change function 130b, and oscillation detection function 130d to detect a particular change in conditions in feedback control loop 200 to initiate a state transition.

Load change/disturbance state 304 represents a condition of control loop 200 wherein a load change occurs in control loop 200 such that plant output signal y(t) significantly deviates from setpoint signal r(t). In load change/disturbance state 304, state logic 120 may be configured to use information from control system 110, such as information regarding a setpoint change in setpoint signal r(t), saturation of controller 202, and/or timing of zero-crossings, peaks, and areas associated with error signal e(t). In load change/disturbance state 304, state logic 120 may also be configured to use output from load change function 130b to evaluate the control performance of control loop 100. State logic 120 may also be configured to use output from normal operation performance function 130a, and oscillation detection function 130c to detect a particular change in conditions in feedback control loop 200 to initiate a state transition.

Setpoint change state 306 represents a condition of control loop 200 wherein a step change is applied to control loop 200 via setpoint signal r(t) that moves plant output signal y(t) to a new value. In a cascaded control scheme, this condition would apply to outer master loops rather than inner slave loops. In setpoint change state 306, state logic 120 may be configured to use information from control system 110, such as information regarding setpoint signal r(t) and plant output signal y(t), saturation of controller 202, and/or timing of zero-crossings, peaks, and areas associated with error signal e(t). In load change/disturbance state 304, state logic 120 may also be configured to use output from setpoint change function 130c to evaluate the control performance of control loop 100.

Persistent oscillation state 308 represents a condition of control loop 200 wherein error signal e(t) exhibits persistent oscillatory behavior. In persistent oscillation state 308, state logic 120 may be configured to use information from control system 110, such as information regarding a setpoint change in setpoint signal r(t), and/or timing of zero-crossings, peaks, and areas associated with error signal e(t). In persistent oscillation state 308, state logic 120 may also be configured to use output from oscillation diagnosis function 130e to evaluate the control performance of control loop 100. State logic 120 may also be configured to use output from normal operation performance function 130a, and load change function 130b to detect a particular change in conditions in feedback control loop 200 to initiate a state transition.

Out-of-control state 310 represents a condition of control loop 200 wherein plant output signal y(t) does not cross the value of setpoint signal r(t) or controller output signal u(t) is saturated for an extended period of time. Out-of-control state 310 may occur where, for example, controller 202 is saturated, sluggish, or disconnected. In out-of-control state 310, state logic 120 may be configured to use information from control system 110, such as information regarding a setpoint change in setpoint signal r(t), saturation of controller 202, and/or timing of zero-crossings, peaks, and areas associated with error signal e(t) to detect a particular change in conditions in feedback control loop 200 to initiate a state transition.

According to an exemplary embodiment, state logic 120 may be initialized in out-of-control state 310 as shown in FIG. 3. In this initial state, state logic 120 waits for either a zero-crossing in error signal e(t), a setpoint change in setpoint signal r( t) to start the state transitions, or the expiration of a time-out period, after which control loop 200 is assumed to be truly out of control. During initialization, the initial state information may be ignored until a zero-crossing in error signal e(t), a setpoint change in setpoint signal r(t) to start the state transitions, or the expiration of a time-out period, whichever occurs first. If a zero-crossing in error signal e(t) is the first to occur, state logic 120 transitions to normal operation state 302. If a setpoint change in setpoint signal r(t) is the first to occur, state logic 120 transitions to setpoint change state 306. If the expiration of a predetermined time-out period is the first to occur, state logic 120 effectively transitions to (i.e., remains in) out-of-control state 310. This initialization process allows state logic 120 to remain in out-of-control state 310 in the event that control loop 200 is truly out of control. After the initial state transition, state logic 120 is active, and subsequent state transitions may occur based on the conditions described below.

In normal operation state 302, state logic 120 may be configured to execute one of four transitions based information acquired from control system 100 and output from one or more testing functions 130. If the time period since the last zero-crossing of error signal e(t) is longer than a predetermined time-out period or if the period for which the controller output signal u(t) is saturated is longer than the predetermined time-out period, state logic 120 may execute a transition 320 to out-of-control state 310. If a setpoint change in setpoint signal r(t) is detected, then state logic 120 may execute a transition 322 to setpoint change state 306. If a load disturbance is detecting using load disturbance detection function 130b, and there is no detected setpoint change in setpoint signal r(t), and an oscillation index is greater than an oscillation threshold as calculated using oscillation detection function 130d, and the controller output signal u(t) is not saturated, then state logic 120 may execute a transition 324 to load change/disturbance state 304. If a stochastic control performance indicator calculated by normal operation performance function 130a is smaller than the oscillation threshold calculated by oscillation detection function 130d, or the oscillation index is smaller than the oscillation threshold as calculated by oscillation detection function 130d, and there is no detected setpoint change in setpoint signal r(t), then state logic 120 may execute a transition 326 to persistent oscillations state 308.

In load change/disturbance state 304, state logic 120 may be configured to execute one of four transitions based information acquired from control system 100 and output from one or more testing functions 130. If a setpoint change in setpoint signal r(t) is detected, then state logic 120 may execute a transition 330 to setpoint change state 306. If a stochastic control performance indicator calculated by normal operation performance function 130a is smaller than the oscillation threshold calculated by oscillation detection function 130d, or the oscillation index is smaller than the oscillation threshold as calculated by oscillation detection function 130d, and there is no detected setpoint change in setpoint signal r(t), then state logic 120 may execute a transition 332 to persistent oscillations state 308. If the time period since the last zero-crossing of error signal e(t) is longer than a predetermined time-out period or if the period for which the controller output signal u(t) is saturated is longer than the predetermined time-out period, state logic 120 may execute a transition 334 to out-of-control state 310. If the detected load change/disturbance causing state logic 120 to transition to load change/disturbance state 120 is complete, and the oscillation index is larger than the oscillation threshold, and there is no detected setpoint change in setpoint signal r(t), then state logic 120 may execute a transition 336 to normal operation state 302.

In setpoint change state 306, if a characterization of the setpoint change in setpoint signal r(t) has been completed by setpoint change function 130c, then state logic 120 may execute a transition 340 to normal operation state 302.

In persistent oscillation state 308, state logic 120 may be configured to execute one of two transitions based information acquired from control system 100 and output from one or more testing functions 130. If a setpoint change in setpoint signal r(t) is detected, then state logic 120 may execute a transition 350 to setpoint change state 306. If a stochastic control performance indicator calculated by normal operation performance function 130a is larger than the oscillation threshold calculated by oscillation detection function 130d, or the oscillation index is larger than the oscillation threshold as calculated by oscillation detection function 130d, and if the controller output signal u(t) is not saturated, or if the period for which the controller output signal u(t) is saturated is shorter than the predetermined time-out period, state logic 120 may execute a transition 352 to normal operation state 302.

In out-of-control state 310, state logic 120 may be configured to execute one of two transitions based information acquired from control system 100 and output from one or more testing functions 130. If a setpoint change in setpoint signal r(t) is detected, then state logic 120 may execute a transition 360 to setpoint change state 306. If a zero-crossing of error signal e(t) is detected before the end of a predetermined time-out period, or if the controller output signal u(t) is not saturated, and there is no detected setpoint change in setpoint signal r(t), then state logic 120 may execute a transition 362 to normal operation state 302.

Referring again to FIG. 1, testing functions 130 will now be described. Normal operation performance function 130a may be configured to evaluate the control performance of control loop 200 when, for example, random stochastic disturbances are the only source of excitation in control loop 200. When random stochastic disturbances are the only source of excitation, error signal e(t) may be modeled as an autoregressive moving average (ARMA) process. The poles of the ARMA model may then be used to evaluate the performance of control loop 200 in response to the random stochastic disturbances.

An exemplary method of estimating the poles of an ARMA model using higher-order crossings is disclosed in U.S. patent application Ser. No. 10/876,854 entitled "Method and Apparatus for Evaluating the Performance of a Control System," filed Jun. 25, 2004, the content of which is hereby incorporated by reference. In this method, counts of zero-crossings in error signal e(t) may be transformed into estimates of ARMA poles via the autocorrelation domain. Autoregressive parameters may then be calculated from the autocorrelation lags. The poles of an ARMA model of control loop 200 correspond to the roots of the characteristic equation and may be used to evaluate control performance. Control loop 200 may be modeled as an ARMA (2,1) process and a damping ratio may be calculated from the poles of the ARMA model. The damping ratio, denoted herein as η may be used to quantify the behavior of a second order system because it is indicative of response aggressiveness yet independent of system bandwidth.

To reduce the effect of pole-zero cancellation and maintain the damping ratio between zero and one, error signal e(t) may be filtered using a low-pass filter having the transfer function given by:

$$H_L(z^{-1}) = \frac{1-\hat{p}_1}{1-\hat{p}_1 z^{-1}} \quad (2)$$

Where $\hat{p}_1$ is the estimated lag-one autocorrelation of the raw error signal. In some applications, error signal e(t) may not have a zero-mean due to the controller output saturation and other nonlinearities. In order to correct the mean of the signal, the signal may also be filtered using a high-pass filter having the transfer function given by:

$$H_H(z^{-1}) = \frac{\hat{p}_1(1-z^{-1})}{1-\hat{p}_1 z^{-1}} \quad (3)$$

After filtering error signal e(t) with the low-pass filter of Eq. (2) and the high-pass filter of Eq. (3), the signal may be modeled as an ARMA (2, 1) process and its poles may be estimated.

According to an exemplary embodiment, good control performance may exist when the maximum absolute value of the sensitivity function $M_s$ is between approximately 1.2 and 2.0. The relationship between $M_s$ and damping ratio η for a second order system may be given by:

$$M_s = \sqrt{\frac{1+8\eta^2+(1+4\eta^2)\sqrt{1+8\eta^2}}{1+8\eta^2+(-1+4\eta^2)\sqrt{1+8\eta^2}}} \quad (4)$$

Using Eq. (4), values of η may be recommended between approximately 0.30 and 0.86 for good control performance. Values of η below this range indicate aggressive control. Values of η above this range indicate a sluggish controller 202.

Eq. (4) gives the recommended values of η for good control performance if the damping ratio of the system may be obtained from normal operating data and the assumed model structure. Because error signal e(t) may be filtered with low-pass and high-pass filters before the damping ratio η is calculated, the model signal may have a higher order than second-order. In this situation, a fitted damping ration $\hat{\eta}$ may be obtained that is an estimate of the damping ratio of the second-order plant plus the filters given by Eq. (2) and Eq. (3). According to an exemplary embodiment, the range of values of $\hat{\eta}$ may be recommended between approximately 0.33 and 0.67 for good control performance.

Load change function 130b may be configured to detect load changes and characterize subsequent responses in control loop 200. An exemplary method for detecting load changes disclosed in U.S. patent application Ser. No. 10/844,663 entitled "Method of and Apparatus for Evaluating the Performance of a Control System," filed May 13, 2004, which issued as U.S. Pat. No. 7,024,336 on Apr. 4, 2006, the content of which is hereby incorporated by reference. In this method, the load change function monitors error signal e(t) where e(t) has an expected value of zero for normal operation. The load change function assesses the variability of error signal e(t) and calculates confidence interval limits around the expected value of zero for normal operation. The confidence interval limits may be adjusted using zero-crossing information for error signal e(t).

A load change is then detected when error signal e(t) exceeds the limits. Load responses may be characterized by calculating the area $A_n$ before and the area $A_p$ after a peak on a response that lies between zero crossings of error signal e(t). A normalized index $\eta_{load}$ related to the damping ration in a second-order model may be calculated from the ratio $$R = \frac{A_n}{A_p}.$$

According to an exemplary embodiment, values of $\eta_{load}$ may be recommended between approximately 0.30 and 0.86 for good control performance where error signal e(t) is not filtered according to Eq. (2) or Eq. (3).

Setpoint change function 130c may be configured to detect a setpoint change to control loop 200 and to identify parameters for plant 204. An exemplary method for identifying control system parameters is disclosed in U.S. patent application Ser. No. 10/093,857 entitled "System and Method for Characterizing a System," filed Mar. 8, 2002, the content of which is hereby incorporated reference. An exemplary method of detecting and characterizing setpoint changes is disclosed in U.S. patent application Ser. No. 10/844,663 entitled "Method of and Apparatus for Evaluating the Performance of a Control System," filed May 13, 2004, which issued as U.S. Pat. No. 7,024,336. In this method, estimates of the closed-loop residence time and the amount of overshoot for the setpoint change in addition to plant gain residence time, and time constant parameters. These parameters may be used to calculate an index that measures the control performance for the setpoint change.

According to an exemplary embodiment, the index may be calculated from two loop performance scores: one for measuring aggressiveness of the controller and the other for measuring its sluggishness. The aggressiveness of controller 202 may be measured during a setpoint change by calculating the amount of overshoot as a fraction of the setpoint step size. Overshoot values of less than five percent of the setpoint step size may be considered acceptable while larger values may be weighted. For example, overshoot values less than five percent may be given a score of one and values larger than five percent may be weighted linearly so that an overshoot of twenty-five percent has a score of 0.5. The aggressiveness score may then be given by:

$$I_a = 1 - \left[\frac{\psi_{OS} - 5}{20}\right] \times 0.5 \quad (5)$$

where $\psi_{OS}$ is the overshoot calculated as a percentage of the setpoint step size. $I_a$ values may be truncated to lie between zero and one. $I_a$ values larger than 0.5 may be considered to be indicative of acceptable performance, while smaller values may indicate aggressive tuning of controller 202.

The sluggishness of controller 202 may be measured by calculating the ratio of the estimated residence times of the closed and open loops, where $T_{CL}$ and $T_{OL}$ are the closed and open loop residence times respectively, and $\psi_T = T_{CL}/T_{OL}$. $\psi_T$ values less than 0.5 may be given a score of one, while larger values may be weighted linearly so that $\psi_T = 2$ receives a score of 0.5. The sluggishness score may then be given by:

$$I_s = 1 - \left[\frac{\psi_T - 5}{1.5}\right] \times 0.5 \quad (6)$$

$I_s$ values may be truncated to lie between zero and one. $I_s$ values larger than 0.5 may be considered to be indicative of acceptable performance, while smaller values may indicate sluggish tuning of controller 202.

The aggressiveness score $I_a$ and the sluggishness score $I_s$ measure the performance of controller 202 for a setpoint change at two levels: the amount by which the controlled variable exceeds the setpoint, and the speed of the closed loop relative to the open loop. These scores may be combined into a single index $I_x$ that characterizes the setpoint change performance for the controller given by:

$$I_x = 1 - \sqrt{(1-I_a)^2 + (1-I_s)^2} \quad (7)$$

$I_x$ values may be truncated to lie between zero and one. According to an exemplary embodiment, good control performance may be indicated by a score close to one, while poor control may be indicated where $I_x < 0.5$.

Oscillation detection function 130d may be configured to detect oscillations in control loop 200. Control loop 200 may exhibit oscillations due to reasons such as poor controller tuning, external periodic disturbances, plant nonlinearities, or system problems such as stiction, poor actuator resolution, etc. Oscillations may occur abruptly as a result of a setpoint change, load disturbance, or gradually when the control performance degrades over time.

According to an exemplary embodiment, normal operation performance function 130a and load change function 130b may be used with oscillation detection function 130d to detect the presence of persistent oscillations in control loop 200 when oscillations are not accompanied by controller saturation. When oscillations are caused by a load disturbance or setpoint change, error signal e(t) may exceed the normal operation limits calculated by load change function 130b and the oscillations may first appear as a series of load disturbances. An oscillation index $\eta_{osc,load}$ may be calculated from the load disturbance characterization $\eta_{load}$ by averaging the ratio of areas R for several load disturbances and then using the average area to calculate $\eta_{osc,load}$. As R has a skewed distribution, but log(R) is symmetric and closer to a Normal distribution and may be averaged instead of R. Setting Z=log(R) and assuming a second order closed-loop model, the damping ratio $\eta_{osc,load}$ may be calculated from $e^{\bar{z}}$, where $\bar{Z}$ is the average value. If $\eta_{osc,load}$ is smaller than a threshold $\epsilon_o$, then oscillations are likely to be occurring in the system.

In some situations, control loop 200 may initially operate under normal conditions while exhibiting increasing oscillatory behavior. This situation may occur as a result of a slow ramp disturbance moving plant 204 to a high gain region and causing oscillations. Under these conditions, the confidence interval limits for normal operation calculated by load change function 130b may increase with the amplitude of the oscillations and envelop them such that they are not detected as a series of load disturbances using $\eta_{osc,load}$. In this situation, oscillation detection function 130d may use $\hat{\eta}$ from normal operation detection function 130a to detect oscillatory behavior. If $\hat{\eta} < \epsilon_o$, where $\epsilon_o$ is a threshold value less than approximately 0.2, then persistent oscillations are present; otherwise persistent oscillations are not present.

Oscillation diagnosis function 130e may be configured to diagnose the cause of detected oscillations in control loop 200. An exemplary method of diagnosing the cause of detected oscillations is disclosed in PCT Application No. PCT/US2005/022127 entitled "Method and Apparatus for Evaluating the Performance of a Control System," filed Jun. 22, 2005, which was published as WO 2006/012158 on Feb. 2, 2006. In this method, the oscillation diagnosis function may be configured to distinguish between oscillations caused by control problems and oscillations caused by system problems, such as stiction, using a ratio of the areas before and after a peak of error signal e(t). According to an exemplary embodiment, frequency domain filtering of the ratio values may be used to reduce the effect of noise, and a probability $P_S$ may be used as a measure of the probability that $P_S$ will be close to one if stiction or a system problem is causing the oscillations.

In some situations, certain signals described above may not be available from controller 202. For example, in some situations it may not be possible to measure error signal e(t) or may not be possible to determine the difference between setpoint signal r(t) and plant output signal y(t) when these signals are not available. In these situations, it may be possible to obtain the analog output signal AO(t) from controller 202, which may in turn be used to estimate error signal e(t). According to an exemplary embodiment, estimating error signal e(t) from the analog output signal AO(t) may be performed where AO(t), minimum and maximum values ($AO_{max}$, $AO_{min}$) of AO(t), minimum and maximum values ($U_{max}$, $U_{min}$) of controller output signal U(s), and the controller gain $K_c$, integral time $\tau_1$, and sampling period $T_s$ are available for controller 202.

Controller output signal u(t) is linearly related to the analog output signal AO(t) by:

$$u(t) = U_{\min} + \left[\frac{U_{\max} - U_{\min}}{AO_{\max} - AO_{\min}}\right](AO(t) - AO_{\min}) \quad (8)$$

Where controller 202 uses a proportional plus integral (PI) control algorithm, controller output signal U(s) and error signal E(s) are related in the Laplace domain by:

$$E(s) = \frac{1}{K_c}\left(\frac{\tau_I s}{\tau_I s + 1}\right)U(s) \quad (9)$$

As shown by Eq. (9), e(t) may be obtained by passing u(t) through a high-pass filter. Where u(t) is held constant between sampling instants, an estimate of e(t) in the time domain may be obtained by:

$$e(t) = \gamma e(t-1) + \frac{\gamma}{K_c}[u(t) - u(t-1)] \quad (10)$$

where $\gamma = e^{-T_s/\tau_I}$, is the sampling period of controller 202, and $U_{min} \leq u(t) \leq U_{max}$. During saturation periods of u(t), u(t)−u (t−1)=0 and Eq. (10) should not be used. In this situation, e(t) may be frozen at its last value e(t−1) until u(t) is no longer saturated.

A setpoint change may be detected by detecting an abrupt change in u(t) caused by the proportional action of controller 202. For example, if setpoint signal r(t) is changed by an amount Δr, where control loop 200 is at steady state, e(t) also changes by approximately Δr. The change in u(t) caused by the proportional action will be $\Delta u = K_c \times \Delta r$. Where the setpoint schedule for control loop 200 is available, the minimum value of Δr is also available. The minimum value of Δu=u(t)−u(t−1) during the setpoint change will be $$\Delta u_{min} = K_c \times \Delta r_{min} \quad (11)$$

If u(t)−u(t−1)>$\Delta u_{min}$, a setpoint change is detected. This approach assumes that the sampling period $T_s$ is much smaller than the integral time $\tau_I$.

Figure 4:
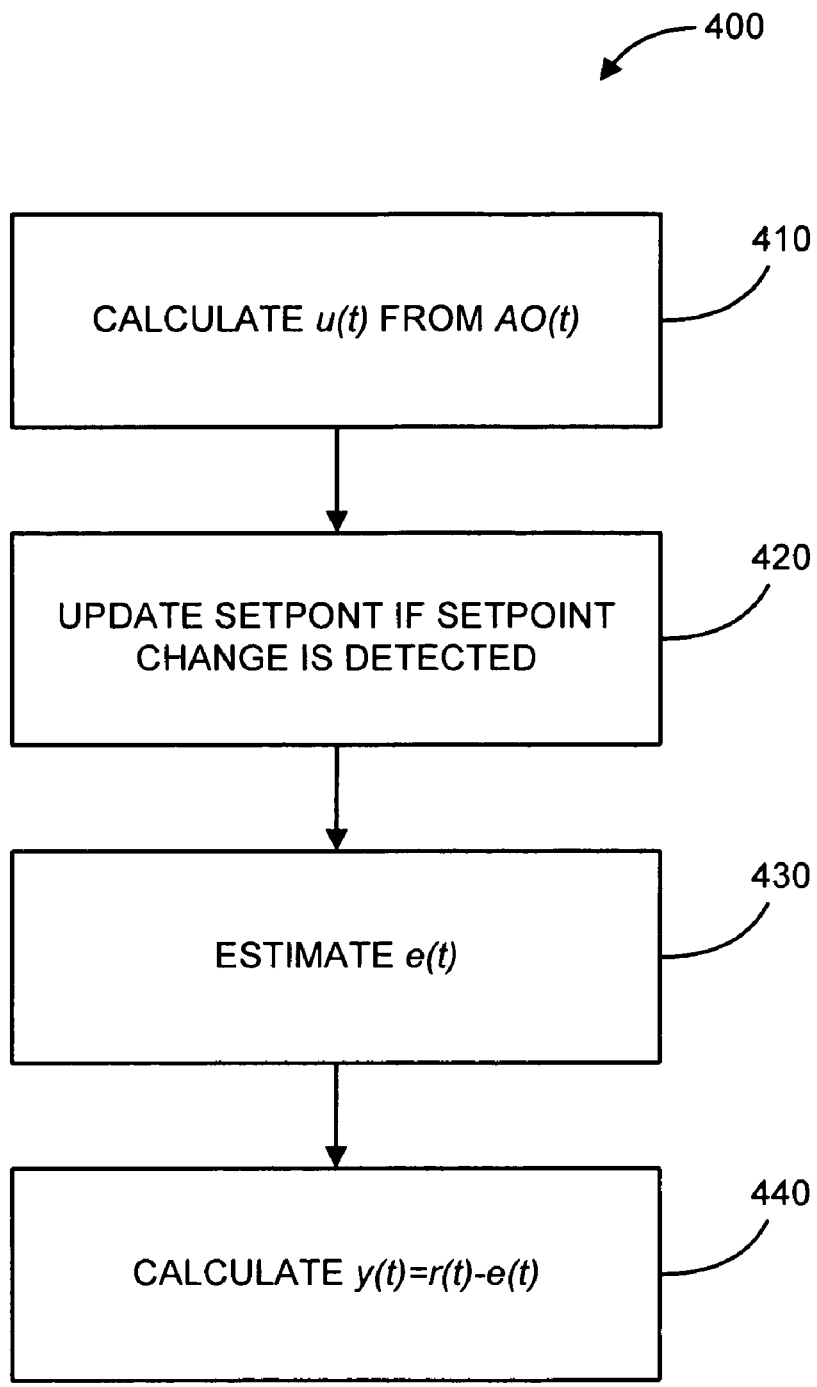
FIG. 4 illustrates a method of estimating inputs and outputs for the feedback control loop of FIG. 2 using an analog output signal according to an exemplary embodiment.

FIG. 4 illustrates a method 400 of estimating inputs and outputs for feedback control loop 200 using analog output signal AO(t) according to an exemplary embodiment. Method 400 begins with a step 402. At step 402, if the value of setpoint signal r(t) is known at initialization of estimation of error signal e(t), then setpoint signal r(t) and feedback signal y(t) may be estimated by calculating U(t) from AO(t) using Eq. (8). At a step 404, if u(t)−u(t−1)>$\Delta u_{min}$, a setpoint change is detected, and the setpoint may be updated as $$r(t) = r(t-1) + \frac{u(t) - u(t-1)}{K_c}.$$

At a step 406, e(t) may be estimated using Eq. (10) where u(t) is not saturated. At a step 408, feedback signal y(t) may be calculated from y(t)=r(t)−e(t). Method 400 is preferably used when u(t) is not saturated.

It should be understood that the construction and arrangement of the elements of the exemplary embodiments are illustrative only. Although only a few embodiments of the present invention have been described in detail in this disclosure, many modifications are possible without materially departing from the novel teachings and advantages of the subject matter recited in the claims. Accordingly, all such modifications are intended to be included within the scope of the present invention as defined in the appended claims. Unless specifically otherwise noted, the claims reciting a single particular element also encompass a plurality of such particular elements. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the exemplary embodiments without departing from the spirit of the present invention as expressed in the appended claims.

What is claimed is:

1. A method of evaluating the performance of a control system using an electronic device having state machine logic, comprising:
   determining a first logic state representative of a first condition of the control system based on data received from the control system;
   executing a first testing function included in the electronic device and associated with the first logic state;
   transitioning to a second logic state representative of a second condition of the control system based on at least one of the received data and an output from the first testing function;
   executing a second testing function included in the electronic device and associated with the second logic state;
   selecting at least one algorithm out of a predetermined set of algorithms;
   evaluating a controller performance based on a condition of the control system, data from the control system and at least one algorithm result;
   providing a diagnosis of the performance of the control system based on the output of at least one of the first testing function, the second testing function, and at least one algorithm result; and
   storing the diagnosis in a memory.

2. The method of claim 1, further comprising:
   detecting a transition event associated with a change in a condition of the control system from a first condition to a second condition.

3. The method of claim 1, wherein the state machine logic includes a plurality of logic states, and wherein at least one of the first logic state and the second logic state is one of a normal operation state, a load change state, a setpoint change state, a persistent oscillation state, and an out-of-control state.

4. The method of claim 1, wherein at least one of the first testing function and the second testing function is one of a normal operation performance function, a load change function, a setpoint change function, an oscillation detection function, and an oscillation diagnosis function.

5. The method of claim 1, wherein the received data includes at least one of a controller output signal, a setpoint signal, and a plant output signal, and controller configuration information.

6. The method of claim 5, wherein the controller configuration information includes controller saturation information.

7. The method of claim 1, further comprising:
   estimating a signal from an analog output signal from the control system, wherein estimating the signal includes
   determining a controller form, a controller gain and an integral time;
   calculating a control error based on the analog output signal, the controller form, the controller gain and the integral time; and
   storing the control error signal in a memory.

8. The method of claim 1, wherein executing the first testing function further includes executing multiple testing functions included in the electronic device and associated with the first logic state; and wherein executing the second testing function further includes executing multiple testing functions included in the electronic device and associated with the second logic state.

9. The method of claim 1, wherein the control system includes a feedback control loop including a controller and a plant.

10. The method of claim 1, wherein the control system includes a proportional plus integral controller.

11. The method of claim 1, wherein the received data includes discrete data samples from the control system.

12. The method of claim 1, wherein the control system is a heating, ventilating, and air-conditioning system.

13. An apparatus for evaluating the performance of a control system, comprising:
   a memory including a plurality of testing functions; and
   state machine logic including a plurality of logic states and configured to perform the steps of:
   determining a first logic state representative of a first condition of the control system based on data received from the control system;
   executing a first testing function associated with the first logic state;
   transitioning to a second logic state representative of a second condition of the control system based on at least one of the received data and an output from the first testing function;
   executing a second testing function included in an electronic device and associated with the second logic state;
   selecting at least one algorithm out of a predetermined set of algorithms;
   evaluating a controller performance based on a condition of the control system, data from the control system and at least one algorithm result;
   providing a diagnosis of the performance of the control system based on the output of at least one of the first testing function, the second testing function, and at least one algorithm result; and
   storing the diagnosis in a memory.

14. The apparatus of claim 13, wherein the state machine logic is further configured to detect a transition event associated with a change in condition of the control system from a first condition to a second condition.

15. The apparatus of claim 13, wherein at least one of the first logic state and the second logic state is one of a normal operation state, a load change state, a setpoint change state, a persistent oscillation state, and an out-of-control state.

16. The apparatus of claim 13, wherein at least one of the first testing function and the second testing function is one of a normal operation performance function, a load change function, a setpoint change function, an oscillation detection function, and an oscillation diagnosis function.

17. The apparatus of claim 13, wherein the received data includes at least one of a controller output signal, a setpoint signal, a plant output signal, and a controller configuration information.

18. The apparatus of claim 17, wherein the controller configuration information includes controller saturation information.

19. The apparatus of claim 13, further comprising:
   a processor operable to execute program logic configured to perform the steps of
   determining a controller form, a controller gain and an integral time;
   calculating a control error based on an analog output signal, the controller form, the controller gain and the integral time; and
   storing the control error signal in a memory.

20. The apparatus of claim 13, wherein the state machine logic is further configured to execute multiple testing functions included in an electronic device and associated with the first logic state; and wherein the state machine logic is further configured to execute multiple testing functions included in the electronic device and associated with the second logic state.

21. The apparatus of claim 13, wherein the control system includes a feedback control loop including a controller and a plant.

22. The apparatus of claim 13, wherein the control system includes a proportional plus integral controller.

23. The apparatus of claim 13, wherein the received data includes discrete data samples from the control system.

24. The apparatus of claim 13, wherein the control system is a heating, ventilating, and air-conditioning system.

25. An apparatus for evaluating the performance of a control system, comprising:
   a memory including a plurality of testing functions; and
   means for detecting a plurality of transition events respectively associated with a plurality of logic states respectively representative of a plurality of conditions of the control system based on data received from the control system;
   means for executing at least a first testing function associated with a first one of the logic states when a first one of the conditions exists, and for executing at least a second testing function associated with a second one of the logic states when a second one of the conditions exists;
   means for selecting at least one algorithm out of a predetermined set of algorithms;
   means for evaluating a controller performance based on a condition of the control system, data from the control system and at least one algorithm result;
   means for providing a diagnosis of the performance of the control system based on an output of at least one of the first testing function, the second testing function, and at least one algorithm result; and
   a means for storing the diagnosis in the memory.

26. The apparatus of claim 25, wherein at least one of the transition events is one of a setpoint change, a load disturbance, saturation of a controller, and an oscillation.

27. The apparatus of claim 25, wherein the plurality of logic states includes at least one of a normal operation state, a load change state, a setpoint change state, a persistent oscillation state, and an out-of-control state.

28. The apparatus of claim 25, wherein the plurality of testing functions includes at least one of a normal operation performance function, a load change function, a setpoint change function, an oscillation detection function, and an oscillation diagnosis function.

29. The apparatus of claim 25, wherein the received data includes at least one of a controller output signal, a setpoint signal, a plant output signal, and controller configuration information.

30. The apparatus of claim 29, wherein the controller configuration information includes controller saturation information.

31. The apparatus of claim 25, further comprising:
   means for estimating a signal from an analog output signal from the control system, wherein estimating the signal includes determining a controller form, a controller gain and an integral time;

calculating a control error based on an analog output signal, the controller form, the controller gain and the integral time; and storing the control error signal in a memory.

32. The apparatus of claim 25, wherein the control system includes a feedback control loop including a controller and a plant.

33. The apparatus of claim 25, wherein the control system includes a proportional plus integral controller.

34. The apparatus of claim 25, wherein the received data includes discrete data samples from the control system.

35. The apparatus of claim 25, wherein the control system is a heating, ventilating, and air-conditioning system.

* * * * *